F. ADEE & J. FOLEY.
Trap for Basins, &c.

No. 162,331.  Patented April 20, 1875.

Witnesses,
Chas. H. Smith
Geo. T. Pinckney

Inventors
Frederick Adee
James Foley
per Lemuel W. Serrell
atty.

THE GRAPHIC CO. PHOTO-LITH. 39 & 41 PARK PLACE, N.Y.

UNITED STATES PATENT OFFICE.

FREDERICK ADEE AND JAMES FOLEY, OF BROOKLYN, NEW YORK.

IMPROVEMENT IN TRAPS FOR BASINS, &c.

Specification forming part of Letters Patent No. 162,331, dated April 20, 1875; application filed March 23, 1875.

*To all whom it may concern:*

Be it known that we, FREDERICK ADEE and JAMES FOLEY, of Brooklyn, in the county of Kings and State of New York, have invented an Improvement in Traps for Basins, Water-Closets, &c., of which the following is a specification:

Traps have heretofore been made of various styles and shapes, complete in themselves, and to these traps the inlet and discharge pipes are connected. Traps are usually employed with lead pipes, and the joints have to be secured by solder, and the traps occupy considerable space and are expensive, and a comparatively small amount of water is contained in such traps, because they are only a bent tube.

Our improvement consists in a trap case or body that is incomplete until the pipe is applied thereto, and the end of the pipe is slipped into the body a given distance, and to pass below the water-level, and forms part of the trap. By this improvement there is no additional joint, and the trap body can be made with much less expense than heretofore, and is very compact, and the trap will contain a larger volume of water without increasing the space occupied by it.

Figure 2:
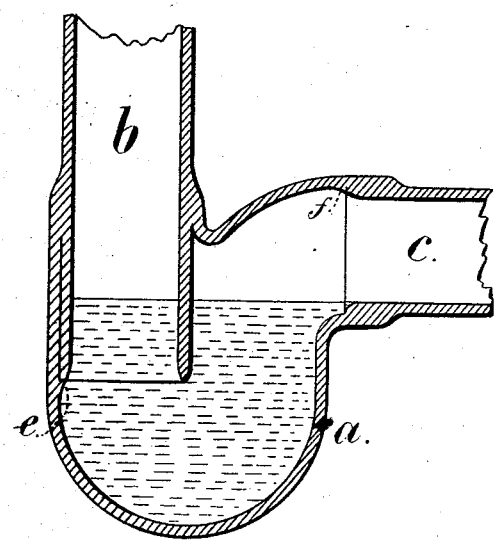
Figure 1:
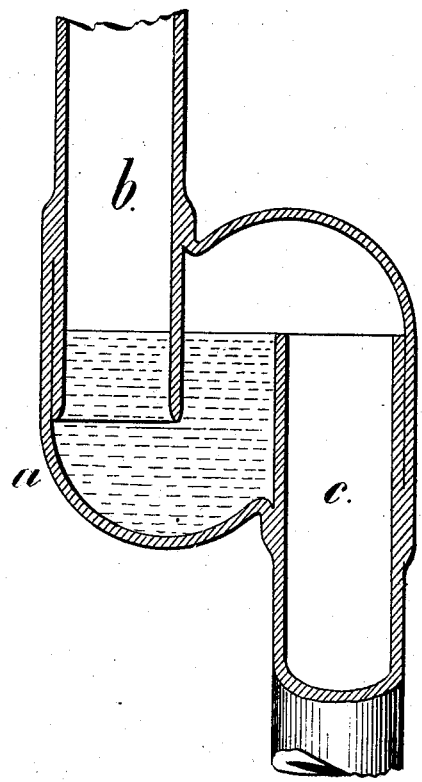
Figure 3:
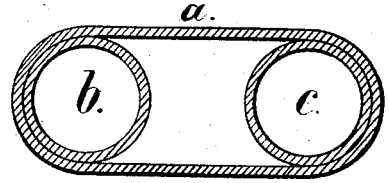

In the drawing, Figure 1 is a section of the S-trap, Fig. 2 is a section of the P-trap, and Fig. 3 is a sectional plan of the body.

The body $a$ of the trap is adapted to receive the ends $b$ and $c$ of the respective inlet and discharge pipes. This body is generally in the form of a flattened spheroid, and with the S-trap the openings for the respective pipes $b$ and $c$ are at opposite sides; but with the P-trap the openings are in the upper part, at right angles to each other, and the outlet-pipe can be connected to the body of this P-trap at any desired angle. The inlet-pipe passes down below the level of the water and excludes smell. At the inner portion of the trap there are stops $e\ f$, preferably cast with the body, so as to determine the points to which the ends of the pipes may be inserted; but the same result may be arrived at by measuring and marking the pipes. The joints are to be secured by solder, and the body is cast either in one piece or in halves, as most convenient; or it may be pressed or otherwise made, and when in two pieces the joint can be made by solder or by melting the parts together.

The body $a$ may be provided with a trap-screw at any desired place.

We do not claim a trap in which there is a pipe extending down into the water contained in said trap, as this pipe has been cast with the strainer in traps for sinks, and in stable-fittings, and the trap for drains has also been cast in one piece with a pipe extending down into the water-space; but none of these are adapted to receive the end of the lead pipe, and form the trap by that pipe soldered into the body.

We claim as our invention—

As a new article of manufacture, a trap body with the openings for the reception of the ends of the connecting-pipes, which pipes form the dams in the trap, when soldered to place in such body, as specified.

Signed by us this 18th day of March 1875.

FREDERICK ADEE.
JAMES FOLEY.

Witnesses:
GEO. T. PINCKNEY,
CHAS. H. SMITH.